Oct. 1, 1957 J. BJORKSTEN 2,807,912
PELAGIC SOLAR STILL AND METHOD FOR SUPPORTING PLANT GROWTH
Filed Dec. 18, 1953 2 Sheets-Sheet 1
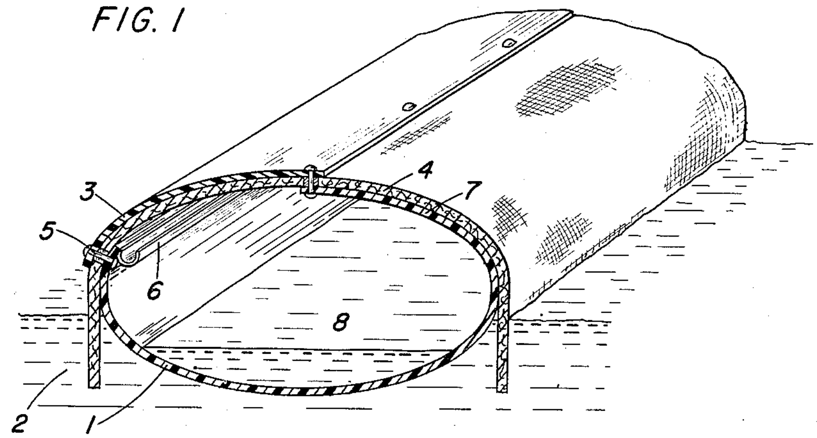
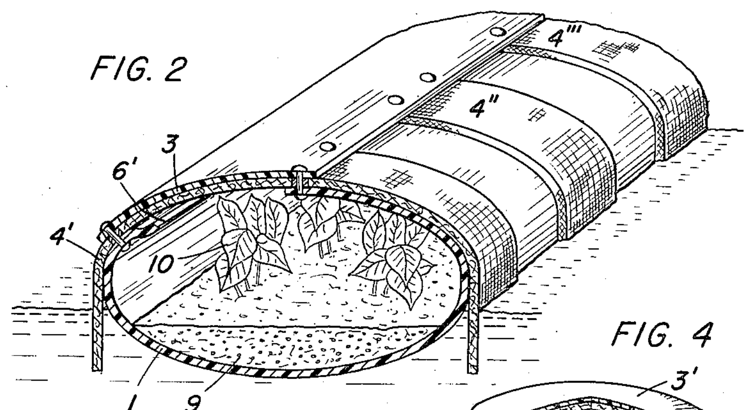
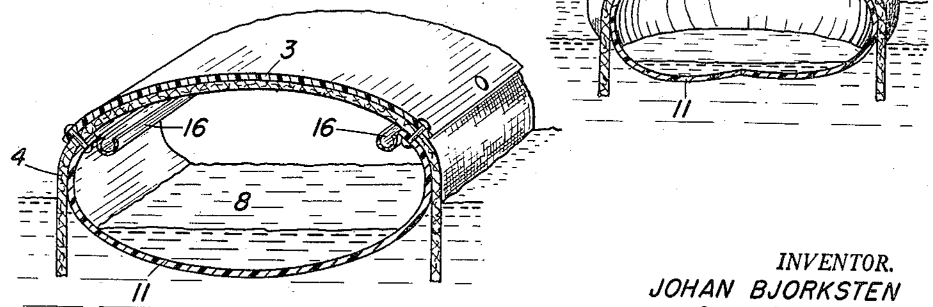
INVENTOR.
JOHAN BJORKSTEN
BY John L. Diehl
Attorney Oct. 1, 1957 J. BJORKSTEN 2,807,912
PELAGIC SOLAR STILL AND METHOD FOR SUPPORTING PLANT GROWTH
Filed Dec. 18, 1953 2 Sheets-Sheet 2
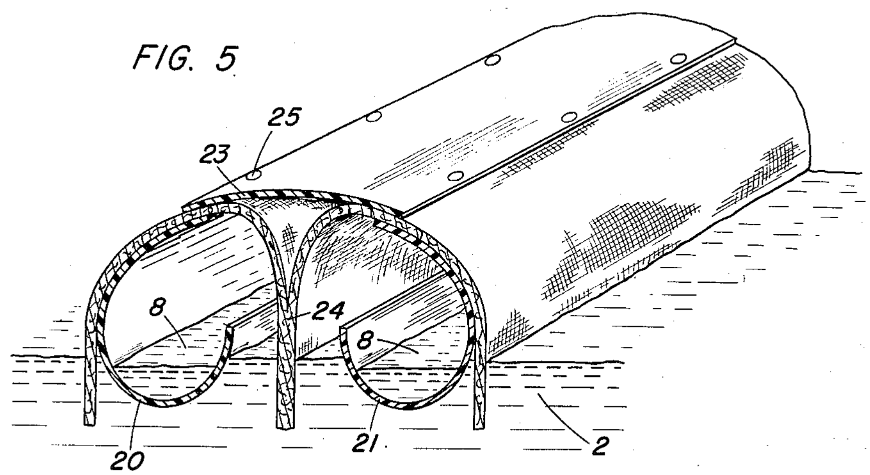
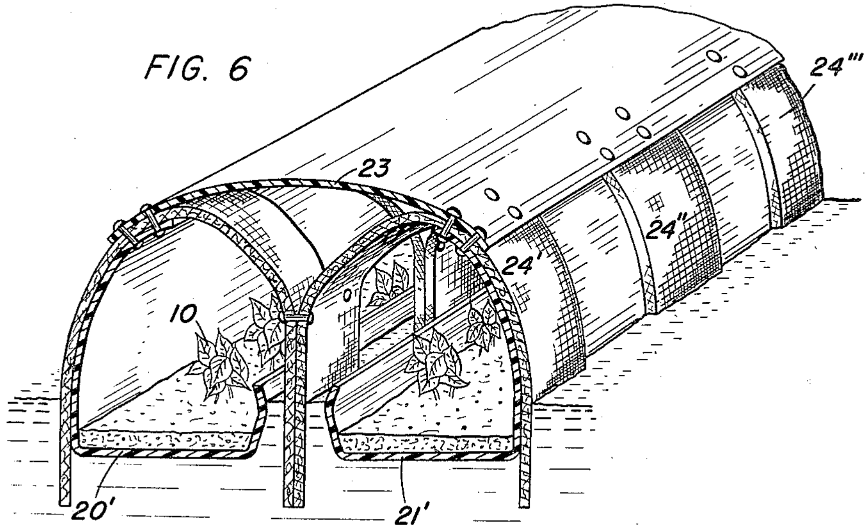
INVENTOR.
JOHAN BJORKSTEN
BY
Attorney United States Patent Office 2,807,912

Patented Oct. 1, 1957

1

2,807,912

PELAGIC SOLAR STILL AND METHOD FOR SUPPORTING PLANT GROWTH

Johan Bjorksten, Madison, Wis.

Application December 18, 1953, Serial No. 399,084

11 Claims. (Cl. 47—58)

This invention relates to a solar still adapted to float on salt water and to support plant growth there.

It is well known that sodium chloride and other salts contained in sea water are detrimental to intensive agriculture and that said salts can be removed from sea water by distillation processes. Various devices have heretofore been described for utilizing the energy of the sun to distill sea water and thereby provide fresh water suitable for drinking, agricultural purposes such as irrigation, and like uses. All of these have had various disadvantages. Some of these have been floatable on the surface of sea water but have had such disadvantages as high cost or critical design factors which prohibited their use on a broad scale.

An object of this invention is to render possible the practice of agriculture on the surface of the ocean.

Another object is a freely floating or pelagic solar still assembly adapted for cultivation of sweet water plants in a condensation area of the still.

Another object is a novel means for producing fresh water.

Another object is a new mode of pelagic hydroponics.

Further objects will become apparent from the drawings and the following detailed description in which it is my intention to illustrate the applicability of the invention without thereby limiting it to a scope less than that of all equivalents which will be apparent to those skilled in the art and in which like reference numerals refer to like parts and in which:

Figure 1 is a partially cross-sectional, partially perspective view of an embodiment containing a single fresh water receptacle;

Figure 2 is a partially cut-away, partially perspective view showing the embodiment of Figure 1 modified to facilitate the cultivation of plants therein;

Figure 3 is a partially cut-away perspective view of another embodiment which provides greater distillation area from the wick;

Figure 4 is a partially cut-away perspective view of a modification of the embodiment of Figure 3 which is substantially spheroidal rather than cylindrical in form.

Figure 5 is a partially cut-away, partially perspective view of another embodiment containing two fresh water receptacle portions;

Figure 6 is a partially cut-away, partially perspective view showing the embodiment of Figure 3 adapted to facilitate the cultivation of plants therein.

Referring now to Figure 1 the device comprises receptacle portion 1, adapted to float on the surface of ocean 2. Extending over the top of the device or a portion of the top of the device is transparent sheet 3 and overlying receptacle 1 and underlying sheet 3 is a porous member or wick 4. The several portions of the device may be attached together with fasteners 5 which may be rivets (as shown), staples, bolts or other suitable fastening means. The wick may be dyed with a dye which absorbs a maximum of solar radiation excepting in the photosynthetically reactive range or as an alternative the wick may be black or extremely dark in color. The material of which transparent sheet 3 is made may be any suitable

2 transparent material such as glass or transparent synthetic resin such as a polyester, polyethylene, a polyacrylic or methacrylic ester, polyacrylonitrile, polyvinylidene chloride, polyvinyl chloride or copolymers of any one of these. The polymeric material may be reinforced with fibrous glass. Receptacle portion 1 may be made of a metal or synthetic resinous material. Metals are generally preferred because of a superior thermal conductivity, titanium, stainless steel and aluminum being especially suitable. Plastics which may be used include fibrous glass reinforced polyester, melamine, phenolic or epoxy resins or polyethylene. Trough 6 may be provided attached to the inner upper edge of receptacle 1 to catch any salt water which may exude outwardly and downwardly from the wick. Salt water collected in trough 6 may be returned to the ocean by any suitable drain means, not shown.

In use the wick imbibes salt water and carries it by capillary action to the area immediately below sheet 3. The wick is here heated by solar radiation passing through sheet 3. As a result the water carried by the wick is heated. The water evaporates from the wick and condenses on the under side of the inwardly and upwardly extending portion 7 of receptacle 1 on the other side of the device. Thence it runs into the bottom of the device and collects as distillate 8. The water vapor evaporated from the wick may also be condensed directly on the surface of the distillate 8 which is maintained at a cool temperature by constant downward conduction of heat to the ocean on which the device floats. Thus a continuous distillation takes place.

Nutrient salts and carbon dioxide may be added to distillate 8 to provide a medium suitable for the culture of algae as well as any higher plants adapted to hydroponic growth conditions. The entrance of the photo-synthetically active spectrum of solar energy into the interior of the device, to facilitate plant culture, is provided either by dyeing the wick in the above mentioned manner to provide a selective absorption of light by the wick or, as shown in Figure 2, by providing wicks interspersed with clear areas through which light may penetrate through transparent sheet 3 directly to the interior of the device.

As further shown in Figure 2, sand or soil 9, or other media suitable for growing plants 10, may be provided in the interior of receptacle 1.

In Figure 2 the inwardly extending edge 6′ of receptacle 1 is adapted to serve the function of trough 6 and prevent sea water exuding from wick 4′ from entering the interior of the receptacle.

If desired the area covered by sheet 3 may be increased and a trough 16 may be disposed on both sides of channel 11 as shown in Figure 3. A device having this cross-section may be extended longitudinally as is the case with the embodiment shown in Figures 1 and 2.

As shown in Figure 4, a device having the same cross-section may be provided as a spheroidal unit, so that when viewed from above, it appears circular. Parts 3′, 16′ and 11′ in Figure 4 correspond in structure and function to parts 3, 16 and 11.

The dimensions of the device are limited only by the distance the capillary power of the wick can move salt water with sufficient speed to provide for suitable evaporation. Inasmuch as this distance with presently available wicks is limited to a few feet, it may be convenient to join a large number of the units in the form of a raft. Such an arrangement offers the advantage of providing a large amount of self-contained space and may be sufficiently large to provide living quarters for farmers and maintenance crew, carbon dioxide generators, storage for hydroponic chemicals, radio equipment and possibly equipment for locomotion.

Referring now to Figure 5 there is shown another embodiment wherein receptacle portions 20 and 21 float on the surface of ocean 2. Extending over the top of the device is a transparent sheet 23 and disposed in between the receptacle portions 20 and 21 on the one hand and sheet 23 on the other hand is a bifurcated wick 24 which dips into the ocean between channel receptacles 20 and 21 and also on the outer sides of these receptacles. Receptacle portions 20 and 21 may be attached to upper transparent sheet 23 by rivets 25 or by other suitable fastening means such as bolts or staples extending through wick 24. Sea water is carried upward by capillary action in wick 24 and is heated, underneath sheet 23, by solar energy passing therethrough. Water evaporates from wick 24 as a result of being so heated and condenses on the upwardly extending walls of channels 20 and 21 which are cooled by outward evaporation of water from wick 24, which overlies these walls. Condensate 8 then collects in channels 20 and 21.

As shown in Figure 6 humus, soil or sand may be provided in channels 20' and 21' and plants 10 may be cultivated therein. To facilitate the cultivation of plants which require sunlight for photo-synthetical processes, it is generally suitable to provide wicks 24', 24'' and 24''' interspersed with clear spaces through which sunlight may shine directly on the plants through sheet 23.

As a material for the wick I prefer to employ long fiber low-twist materials such as for example cotton, viscous rayon, polyamide, polyacrylo or polyurethane fibers.

It is thus seen that the invention is broad in scope and is not to be limited excepting by the claims, in which it is my intention to cover all novelty inherent in the invention and as broadly as possible in view of prior art.

Having thus disclosed my invention, I claim:

1. The process of irrigating plants with fresh water which comprises lifting ocean water upwards to an evaporation zone by capillary means independent of said plants or any supporting means therefor, applying radiant solar energy to said water in said zone, condensing the resultant evaporated vapor on a surface of granular solid plant supporting material cooled by said evaporation of ocean water.

2. The process of irrigating plants with fresh water, which comprises lifting ocean water upwards to an evaporation zone by capillary means apart from said plants and supporting means therefor, applying radiant solar energy to said water in said zone, condensing the resultant evaporated vapor essentially only on the surface of material adapted to support plant growth, and plants supported thereby.

3. A solar still comprising a substantially closed receptacle adapted to float on a body of water and having a bottom, top and sides, capillary means for lifting water from said body above said receptacle, a distilling surface communicating with the interior of said receptacle and a condensing surface communicating with the interior of said receptacle characterized by said condensing surface comprising the upper surface of a bed of plant supporting material contained in said receptacle and supported by said bottom thereof.

4. A solar still comprising a closed receptacle adapted to float on a body of water and having a bottom, top and sides, capillary means for lifting water from said body above said receptacle, a distilling surface communicating with the interior of said receptacle and a condensing surface communicating with the interior of said receptacle characterized by said condensing surface consisting essentially of the upper surface of a bed of plant supporting material contained in said receptacle and supported by said bottom thereof.

5. A solar still comprising a closed receptacle adapted to float on a body of water and having a bottom, top and sides, capillary means for lifting water from said body above said receptacle, a distilling surface communicating with the interior of said receptacle and condensing surfaces contained in the interior of said receptacle, characterized by said condensing surfaces comprising the upper surface of a bed of plant supporting material contained in said bottom of said receptacle and the surfaces of plants growing therein.

6. A solar still comprising a closed receptacle adapted to float on a body of water and having a bottom, top and sides, capillary means for lifting water from said body above said receptacle, a distilling surface communicating with the interior of said receptacle and a condensing surface communicating with the interior of said receptacle characterized by said condensing surface consisting essentially of the upper surface of a bed of plant supporting material contained in said bottom of said receptacle.

7. A solar still comprising a closed receptacle adapted to float on a body of water and having a bottom, top and sides, capillary means for lifting water from said body above said receptacle, a distilling surface communicating with the interior of said receptacle characterized by said condensing surface consisting essentially of the upper surface of a bed of plant supporting material contained in said bottom of said receptacle and surfaces of plants growing therein.

8. A solar still consisting essentially of a closed receptacle adapted to float on a body of water, a bed of plant supporting material contained in said receptacle, capillary means for lifting water from said body above said receptacle, a distilling surface communicating with the interior of said receptacle and condensing surfaces contained within the interior thereof characterized by said condensing surfaces consisting essentially of the upper surface of said bed of plant supporting material and surfaces of plants growing therein and portions of walls of said receptacle adapted to be cooled by evaporation of water from capillary means overlying and in contact with said portions.

9. In a solar still a bed of plant supporting material contained in a receptacle adapted to float on a body of salt water, the sides of said receptacle extending substantially upward from the sides of said bed above the surface of said body of water, a wick extending thereover and adapted to extend into the salt water and a transparent sheet member extending thereover in contact with the upper surface of said wick, said device being characterized by the surface of said body of plant supporting material and surfaces of plants contained therein substantially constituting the majority of condensing surface for water evaporated into the interior of said still from said wick.

10. A solar still comprising a bed of plant supporting material contained in a receptacle adapted to float on the surface of an ocean and to be cooled thereby, the sides of said receptacle extending substantially upwardly from the sides of said bed above the surface of said ocean, capillary means extending into said ocean outward of said receptacle for lifting ocean water above said receptacle and a covering member in contact with said capillary means, said device being characterized by the surface of said body of plant supporting material and surfaces of plants contained therein substantially constituting the majority of condensing surfaces for water evaporated into the interior of said still from said capillary means.

11. The device of claim 10 wherein said covering member is a single sheet of organic synthetic resin.

References Cited in the file of this patent

UNITED STATES PATENTS

| | | |
|---|---|---|
| 1,544,029 | Nelson | June 30, 1925 |
| 2,019,831 | Ricardo | Nov. 5, 1935 |
| 2,455,834 | Ushakoff | Dec. 7, 1948 |
| 2,592,976 | Thomas | Apr. 15, 1952 |

FOREIGN PATENTS

| | | |
|---|---|---|
| 232,960 | Germany | Mar. 27, 1911 |
| 224,154 | Switzerland | Feb. 1, 1943 |